April 30, 1957   M. H. EMRICK   2,790,646
FLEXIBLE DRIVE MULTIPLE CHUCK HEADS
Filed Sept. 24, 1954   2 Sheets-Sheet 1
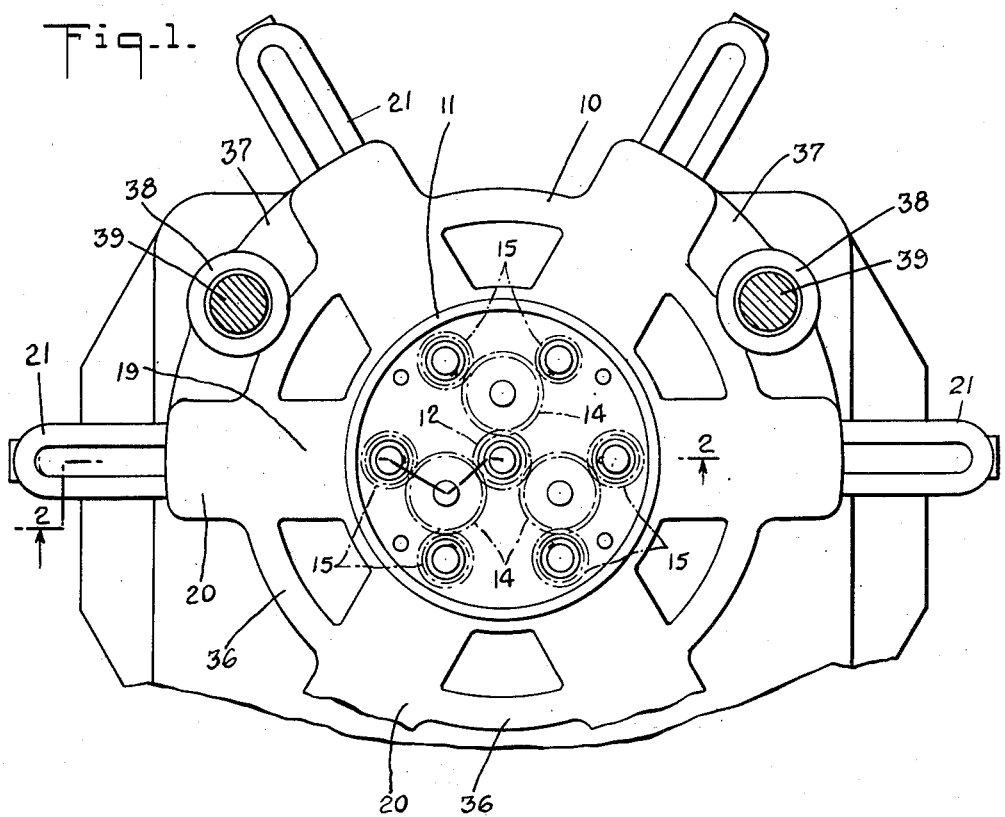
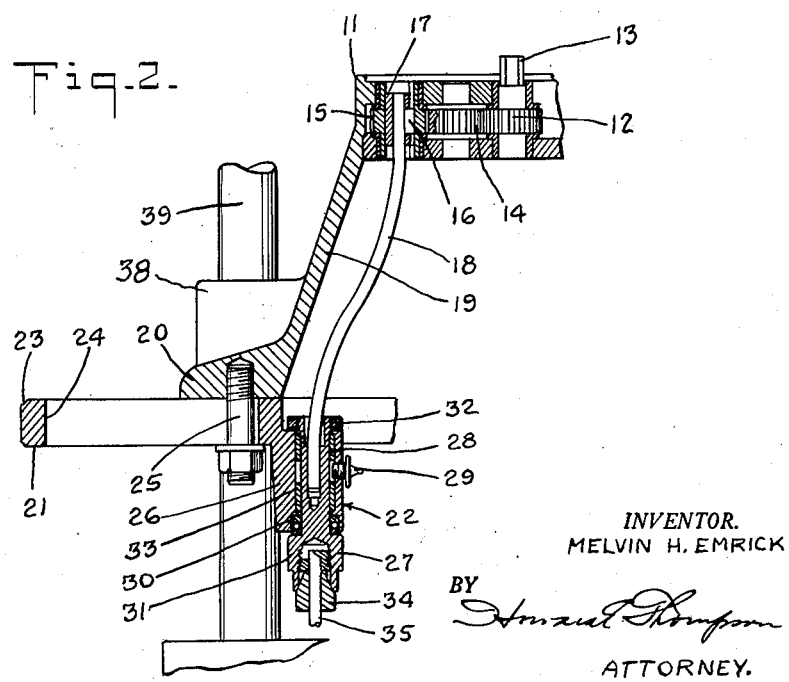
INVENTOR.
MELVIN H. EMRICK
BY
*Howard Thompson*
ATTORNEY.

April 30, 1957 M. H. EMRICK 2,790,646
FLEXIBLE DRIVE MULTIPLE CHUCK HEADS
Filed Sept. 24, 1954 2 Sheets-Sheet 2
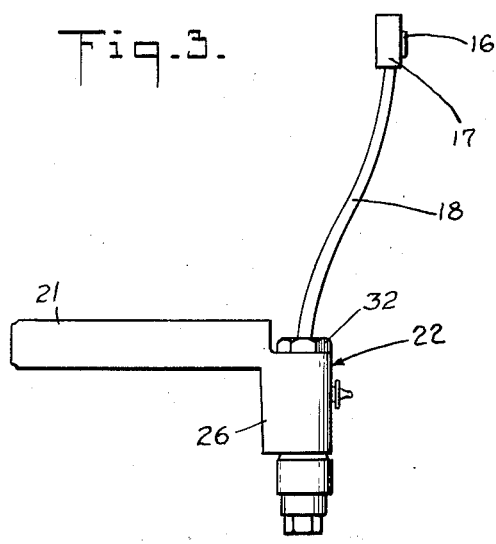
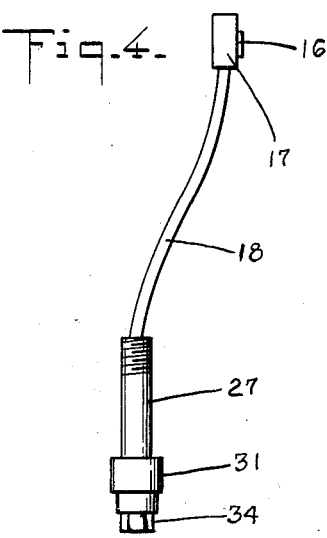
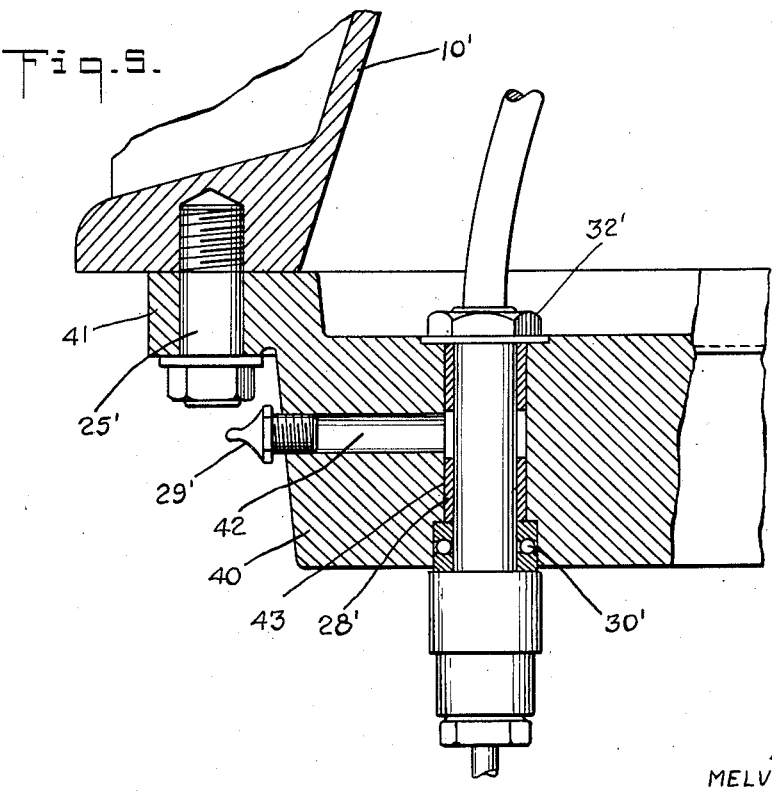
INVENTOR.
MELVIN H. EMRICK
BY
ATTORNEY.

United States Patent Office 2,790,646
Patented Apr. 30, 1957

2,790,646

FLEXIBLE DRIVE MULTIPLE CHUCK HEADS

Melvin H. Emrick, Manhasset, N. Y.

Application September 24, 1954, Serial No. 458,085

3 Claims. (Cl. 279—1)

This invention relates to multiple chuck heads for use in performing drilling and tapping operations. More particularly, the invention deals with a head having independent means for adjusting a plurality of chucks so as to position the chucks in substantially any position over the area of the chuck head.

Still more particularly, the invention deals with a chuck head of the character described, comprising a flexible shaft drive between each drive gear and the chuck, thereby materially simplifying the structure of the multiple head.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a partial plan view of a head made according to my invention.

Fig. 2 is a section on the broken line 2—2 of Fig. 1, omitting most of the background showing.

Fig. 3 is a detailed side view of a chuck unit detached.

Fig. 4 is a detailed view of a chuck assemblage detachable with respect to the unit shown in Fig. 3; and Fig. 5 is an enlarged detailed view, generally similar to Fig. 2, showing a modified form of head.

In Fig. 1 of the drawing, I have shown at 10 a multiple head. This head comprises a cylindrical body 11, centrally of which is arranged the main drive gear 12, having an extended coupling shaft 13, with which suitable driving means of a drill press or the like is coupled.

Spaced around the drive gear 12 are three idler gears 14, note Fig. 1 of the drawing. These gears, in turn, each actuate pairs of gears 15. Each of the gears 15 have key bores, with which a key 16 on the sleeve 17 of a flexible shaft 18 is mounted, so that each flexible shaft is directly keyed to each of the gears 15 of the head. The sleeve 17 and key 16 may be said to comprise a key coupling. The head includes depending outwardly flared wall portions 19, as clearly noted in Fig. 2 of the drawing and these wall portions have, at their lower ends, enlargements 20, in which bracket portions 21 of chuck units 22 are adjustably mounted.

As each bracket 21 is of the same construction as well as each chuck unit, the brief description of one of the brackets and units, as clearly illustrated in Fig. 2 of the drawing, will apply to all.

The bracket of each unit has an arm 23, in which is an elongated aperture 24 to receive a screw 25 in operative engagement with the enlargement 20, the screw serving to clamp the bracket in different positions of adjustment over an area from the central portion of the head to positions between adjacent chuck units.

Each bracket also includes a depending bearing portion 26, in which a spindle 27 is rotatably mounted. A suitable bearing sleeve 28 is provided in the bearing portion 26 and coupled with the bearing 26 is a lubricating nozzle or fitting 29, by means of which the bearing 28 and spindle 27 may be lubricated. A roller thrust bearing 30 is employed at the lower end of the bearing 26 and, upon which, an enlarged portion 31 of the spindle seats, as clearly noted.

The upper end portion of the spindle 27 is threaded to receive a nut 32 for retaining the spindle of the chuck unit against displacement from the bearing 26.

The spindle 27 has, at its upper end portions, a bore 33, in which the lower end portion of the flexible shaft is fixed in any desired manner, so that rotation of the flexible shaft 18 will be directly transmitted to the spindle 27 of the chuck unit 22.

Detachably mounted in the lower end portion of the spindle 27 is a tool supporting collet 34, in which a drill or tap 35 is mounted to be directly driven by the spindle 27 in the rotation thereof through the medium of the flexible shaft.

Considering Fig. 1 of the drawing, it will appear that the enlarged portions 20 are braced by webs 36 and two of these webs include flange portions 37 and vertically disposed cylindrical portions or bearings 38 to receive guide rods 39 of a press, upon which the head 10 is slidably mounted in movement of the various tools 35 of the chuck units 22 toward and from a workpiece. One of the rods 39 is also indicated in Fig. 2 of the drawing.

In multiple heads of the type and kind under consideration, it will be apparent that the chuck units 22, as a unit, can be sold as a replacement part and readily attachable and detachable with respect to the head, the key end 16 of the flexible shaft of each unit being first coupled with its gear, after which, the bracket 21 is coupled with and adjustable on the head, or the enlarged portion 20 thereof to the desired use position.

As a further breakdown, the chuck shaft assemblage, as shown in Fig. 4 of the drawing, can also be dealt with as a replacement part of the multiple head unit, without renewal or replacement of the bracket 21 including the nut 32 for securing the chuck assemblage in the bracket.

In Fig. 5 of the drawing, I have shown a modified form of head structure, part of the head being shown at 10′, this head being generally similar to the head 10. However, substituted for the independent brackets 21 is a single chuck supporting plate 40, which is held in position by screws 25′, generally similar to the screws 25, the screws passing through flanges 41 on the plate 40. Here chuck assemblages, generally similar to the assemblages shown in Fig. 4, have fixed mountings in the plate 40 and, as the chuck assemblages are generally similar to those shown in Fig. 4, no further detailed description of these assemblages will be given.

Chuck assemblages shown in Fig. 4 will be interchangeable with respect to mounting in the brackets 21 or in the plate 40. The plate 40 will have lubricating nozzles or fittings 29′ registering with apertures 42 in the plate directed to the bores 43, in which the chuck assemblages are mounted and to lubricate bearings 28′, generally similar to the bearings 28. Ball bearings 30′, similar to the bearings 30, are also mounted in the plate instead of the bracket 21 and nuts 32′ are employed for detachable mounting of the units 22 in the plate 40.

Structures of the type and kind disclosed in Fig. 4 of the drawing are utilized where a relatively large number of products are to be produced with a common spacing of drilled and/or tapped holes which would justify the production of the plate 40 with the fixed arrangement and spacing of the chuck units therein. On the other hand, where a limited number of products are to be produced with irregular spacing of drilled and tapped holes, the bracket-type structure of Figs. 1 to 3, inclusive, is preferred. It will be apparent, however, that a shop equipped with the one head 10 on a machine can utilize this head in conjunction with the independent chuck assemblages, including the brackets 21, or the plate structure 40 with the fixed arrangement of the chuck assemblages therein.

By providing the flexible shaft drive in the chuck assemblages, I am able to dispense with complicated and expensive gearing and, further, these flexible shafts provide a wider range of adjustment of the chuck spindles and the tools coupled therewith over an area governed by the diameter of the head and mounting of the brackets 21 within the head.

Further, the spindles of the chuck assemblages can be kept to a minimum diameter, which enables the various chucks and tools driven thereby to be positioned in closer proximity to each other. In the present illustration, I have shown, in Fig. 1 of the drawing, a six chuck unit multiple head. This is simply by way of illustration, as these heads may have different numbers of chuck units, depending largely upon the requirements of any particular plant and in the production of different products having varied numbers of holes to be drilled and tapped in a single operation.

Having fully described my invention, what I claim as new and desire to secure by Letters Patent is:

1. In multiple heads having a plurality of driving means, a chuck unit comprising a bracket, a spindle rotatably mounted in and detachable with respect to said bracket, means on the spindle for coupling a tool therewith, a flexible shaft fixed to said spindle and projecting therebeyond, the free end portion of the flexible shaft having a sleeve including an integral key, and the driving means for each unit including a bore having an elongated keyway, into and out of which said key sleeve is freely movable longitudinally of the bore of said driving means in coupling and uncoupling the flexible shaft with said driving means.

2. In multiple chuck heads having a plurality of driving means, each including a bore having an elongated keyway, a tool supporting spindle, a flexible shaft fixed to said spindle, the free end of said shaft having a key coupling sleeve fixed thereto, and said sleeve being freely movable into and out of the bore of a driving means with the key of said sleeve slidable in the keyway of said bore in quickly coupling and uncoupling the shaft with said driving means.

3. In multiple chuck heads having a plurality of driving means, each including a bore having an elongated keyway, a tool supporting spindle, a flexible shaft fixed to said spindle, the free end of said shaft having a key coupling sleeve fixed thereto, said sleeve being freely movable into and out of the bore of a driving means with the key of said sleeve slidable in the keyway of said bore in quickly coupling and uncoupling the shaft with said driving means, said tool supporting spindle having an enlarged lower end, the upper end of the spindle having a bore, said flexible shaft being fixed in the bore of said spindle, the free end of the spindle being externally threaded, and means, on said threaded end, for clamping a suitable support between said enlarged end and last named means.

References Cited in the file of this patent

UNITED STATES PATENTS

| | | |
|---|---|---|
| 560,171 | Oehring | May 12, 1896 |
| 857,690 | Toon | June 25, 1907 |
| 1,058,045 | Fox | Apr. 8, 1913 |
| 1,324,787 | Berge | Dec. 16, 1919 |